United States Patent
Burks et al.

(10) Patent No.: US 11,927,567 B2
(45) Date of Patent: Mar. 12, 2024

(54) CYLINDER BOSS CRACKING DETECTION SYSTEM

(71) Applicant: HEXAGON TECHNOLOGY AS, Alesund (NO)

(72) Inventors: Brian Burks, Parker, CO (US);
Sulochana Shrestha, Aurora, CO (US);
Zack Prather, Englewood, CO (US)

(73) Assignee: HEXAGON TECHNOLOGY AS (NO)

( * ) Notice: Subject to any disclaimer, the term of this patent is extended or adjusted under 35 U.S.C. 154(b) by 228 days.

(21) Appl. No.: 17/516,536

(22) Filed: Nov. 1, 2021

(65) Prior Publication Data
US 2023/0134300 A1    May 4, 2023

(51) Int. Cl.
*G01N 29/14*    (2006.01)
*G01N 29/24*    (2006.01)

(52) U.S. Cl.
CPC ......... *G01N 29/14* (2013.01); *G01N 29/2437* (2013.01); *G01N 2291/011* (2013.01); *G01N 2291/028* (2013.01)

(58) Field of Classification Search
CPC .... G01N 29/14; G01N 29/2437; G01N 29/07; G01N 29/223; G01N 29/42; G01N 29/46; G01N 29/043; G01N 2291/011; G01N 2291/028; G01N 2291/0231; G01N 2291/0289; G01N 2291/2634
See application file for complete search history.

(56) References Cited

U.S. PATENT DOCUMENTS

| | | | |
|---|---|---|---|
| 4,452,087 A | 6/1984 | D'Antonio | |
| 8,201,454 B2 | 6/2012 | Paige | |
| 2013/0263667 A1* | 10/2013 | Volker | G01N 29/04 73/598 |

FOREIGN PATENT DOCUMENTS

| | | | |
|---|---|---|---|
| CA | 3024810 A1 | 5/2019 | |
| FR | 2594948 B1 | 8/1987 | |
| FR | 3016424 A1 | 7/2015 | |
| RU | 2696943 C1 | 8/2019 | |

* cited by examiner

*Primary Examiner* — Suman K Nath
(74) *Attorney, Agent, or Firm* — SNELL & WILMER L.L.P.

(57) ABSTRACT

Disclosed is a system for monitoring a boss of a composite structure for a boss cracking event. The system includes a first sensor located on an outer surface of a neck of the boss and configured to detect first deformation data associated with the boss. The system also includes a second sensor located on the outer surface of the neck of the boss at a location diametrically opposite of the first sensor and configured to detect second deformation data associated with the boss. The system also includes a controller communicatively coupled to the first sensor and the second sensor and configured to determine, based on the first deformation data and the second deformation data, whether a boss cracking event has occurred.

21 Claims, 18 Drawing Sheets

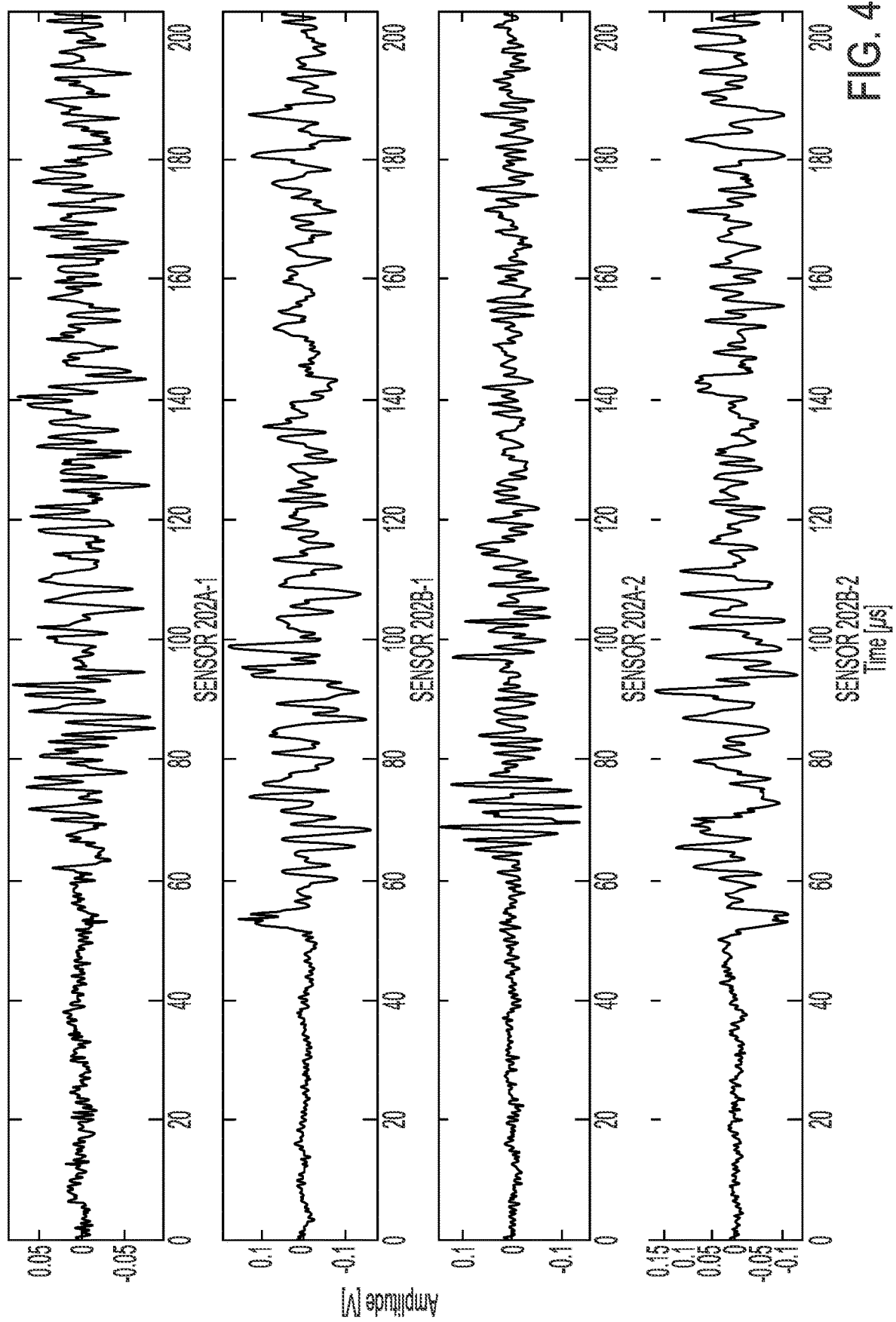

CYLINDER BOSS CRACKING DETECTION SYSTEM

BACKGROUND

1. Field

This specification relates to a system for monitoring bosses of composite cylinders.

2. Description of the Related Art

Vehicles may be used to transport occupants and/or cargo. Some vehicles for transporting cargo are powered using fuel stored in cylinders. Parts of these cylinders may become damaged during installation or during use. When the cylinders become damaged, it is important to repair or replace the cylinders.

SUMMARY

What is described is a system for detecting a crack in a boss of a cylinder. The system includes a first sensor located on an outer surface of a neck of the boss and configured to detect first deformation data associated with the boss. The system also includes a second sensor located on the outer surface of the neck of the boss at a location opposite the first sensor and configured to detect second deformation data associated with the boss. The system also includes a controller communicatively coupled to the first sensor and the second sensor and configured to determine, based on the first deformation data and the second deformation data, whether a boss cracking event has occurred.

The system may optionally include one or more of the following features. The first sensor and the second sensor may be broadband piezoelectric sensors. The controller may determine whether the boss cracking event has occurred using modal acoustic emission (MAE) to analyze the first deformation data and the second deformation data. The controller may be configured to determine whether the boss cracking event has occurred based on detecting a 180 degree phase shift between the first deformation data and the second deformation data.

The first deformation data may include a first arrival time of a first waveform. The second deformation data may include a second arrival time of a second waveform. The controller may be further configured to determine whether the boss cracking event has occurred based on a difference between the first arrival and the second arrival time being lower than a threshold time. The controller may be further configured to determine whether the boss cracking event has occurred based on detection of high frequency content occurring at high $\Delta K$ levels where the boss cracking event is a crack extension. The controller may be further configured to determine whether the boss cracking event has occurred based on detection of low frequency content occurring at low $\Delta K$ levels where the boss cracking event is a crack closure.

The first sensor and the second sensor may be a first pair of sensors. The system may further include a second pair of sensors located on the outer surface of the neck of the boss at opposite sides. The controller may be configured to determine whether the boss cracking event has occurred based on deformation data from the sensors of the first pair of sensors and the second pair of sensors. The system may further include an output device communicatively coupled to the controller. The output device may be configured to provide a notification when the controller determines the boss cracking event.

Also described is a device for detecting a crack in a boss of a cylinder. The device includes a first sensor located on an outer surface of a neck of the boss and configured to detect first deformation data associated with the boss. The device also includes a second sensor located on the outer surface of the neck of the boss at a location opposite the first sensor and configured to detect second deformation data associated with the boss. The device also includes a controller communicatively coupled to the first sensor and the second sensor and configured to determine, based on the first deformation data and the second deformation data, whether a boss cracking event has occurred.

The device may optionally include one or more of the following features. The first sensor and the second sensor may be broadband piezoelectric sensors. The controller may determine whether the boss cracking event has occurred using modal acoustic emission (MAE) to analyze the first deformation data and the second deformation data. The controller may be configured to determine whether the boss cracking event has occurred based on detecting a 180 degree phase shift between the first deformation data and the second deformation data.

The first deformation data may include a first arrival time of a first waveform. The second deformation data may include a second arrival time of a second waveform. The controller may be further configured to determine whether the boss cracking event has occurred based on a difference between the first arrival and the second arrival time being lower than a threshold time. The controller may be further configured to determine whether the boss cracking event has occurred based on detection of high frequency content occurring at high $\Delta K$ levels where the boss cracking event is a crack extension. The controller may be further configured to determine whether the boss cracking event has occurred based on detection of low frequency content occurring at low $\Delta K$ levels where the boss cracking event is a crack closure.

The first sensor and the second sensor may be a first pair of sensors. The system may further include a second pair of sensors located on the outer surface of the neck of the boss at opposite sides. The controller may be configured to determine whether the boss cracking event has occurred based on deformation data from the sensors of the first pair of sensors and the second pair of sensors. The system may further include an output device communicatively coupled to the controller. The output device may be configured to provide a notification when the controller determines the boss cracking event.

Also described is a method for detecting a crack in a boss of a cylinder. The method includes detecting, using a first sensor located on an outer surface of a neck of the boss, first deformation data associated with the boss. The method also includes detecting, using a second sensor located on the outer surface of the neck of the boss at a location opposite the first sensor, second deformation data associated with the boss. The method also includes determining, by a controller communicatively coupled to the first sensor and the second sensor, based on modal acoustic emission analysis of the first deformation data and the second deformation data, whether a boss cracking event has occurred. The method also includes providing, by an output device communicatively coupled to the controller, a notification when the controller determines the boss cracking event.

The method may optionally include one or more of the following features. Determining whether the boss cracking event has occurred may include detecting a 180 degree phase shift between the first deformation data and the second deformation data. The first deformation data may include a first arrival time of a first waveform. The second deformation data may include a second arrival time of a second waveform. Determining whether the boss cracking event has occurred may further include determining whether a difference between the first arrival time and the second arrival time is lower than a threshold time. Determining whether the boss cracking event has occurred may further include detecting high frequency content occurring at high $\Delta K$ levels or low frequency content occurring at low $\Delta K$ levels where the boss cracking event is a crack extension when high frequency content is detected and the boss cracking event is a crack closure when low frequency content is detected.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 4-10 illustrate sensor data of the system, according to various embodiments.

DETAILED DESCRIPTION

Disclosed herein are systems, devices, and methods for monitoring bosses of composite cylinders. The systems, devices, and methods disclosed herein automatically detect damage to the boss and take corresponding steps. The systems, devices, and methods described herein improve the safety of vehicles using the composite cylinders, as the integrity of the composite cylinders is able to be accurately evaluated to prevent use of cylinders which have compromised bosses.

The systems, devices, and methods disclosed herein detect fatigue crack growth within bosses of composite overwrapped pressure vessels (COPV). In Type 4 COPVs, a metallic boss is integrated into the liner to provide a means of connection for filling operations and can also be used for mounting the cylinders into framing. The bosses may be through ports, or blind (i.e., no open pathway for a compressed gas to atmosphere). Cracking of blind bosses can be particularly challenging to assess due to the inaccessible nature of the fractured surface with traditional non-destructive testing (NDT) probes (e.g., Ultrasound or Eddy Current). Thus, there is a need for improved systems for detecting damage to bosses. The systems, vehicles, and methods described herein use MAE inspection to detect damage to bosses and overcomes these limitations.

As used herein, "driver" may refer to a human being driving a vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle. As used herein, "cylinder" includes storage tanks, pressure vessels, and other containers that can be used to store a gas and is not necessarily limited to a specific shape such as a right cylinder and/or a cylinder having a constant or unvarying circular shape in cross-section. As used herein, "fuel" or "gas" refers to any fluid used to power a vehicle, such as gaseous fuel or liquid fuel.

Figure 1:
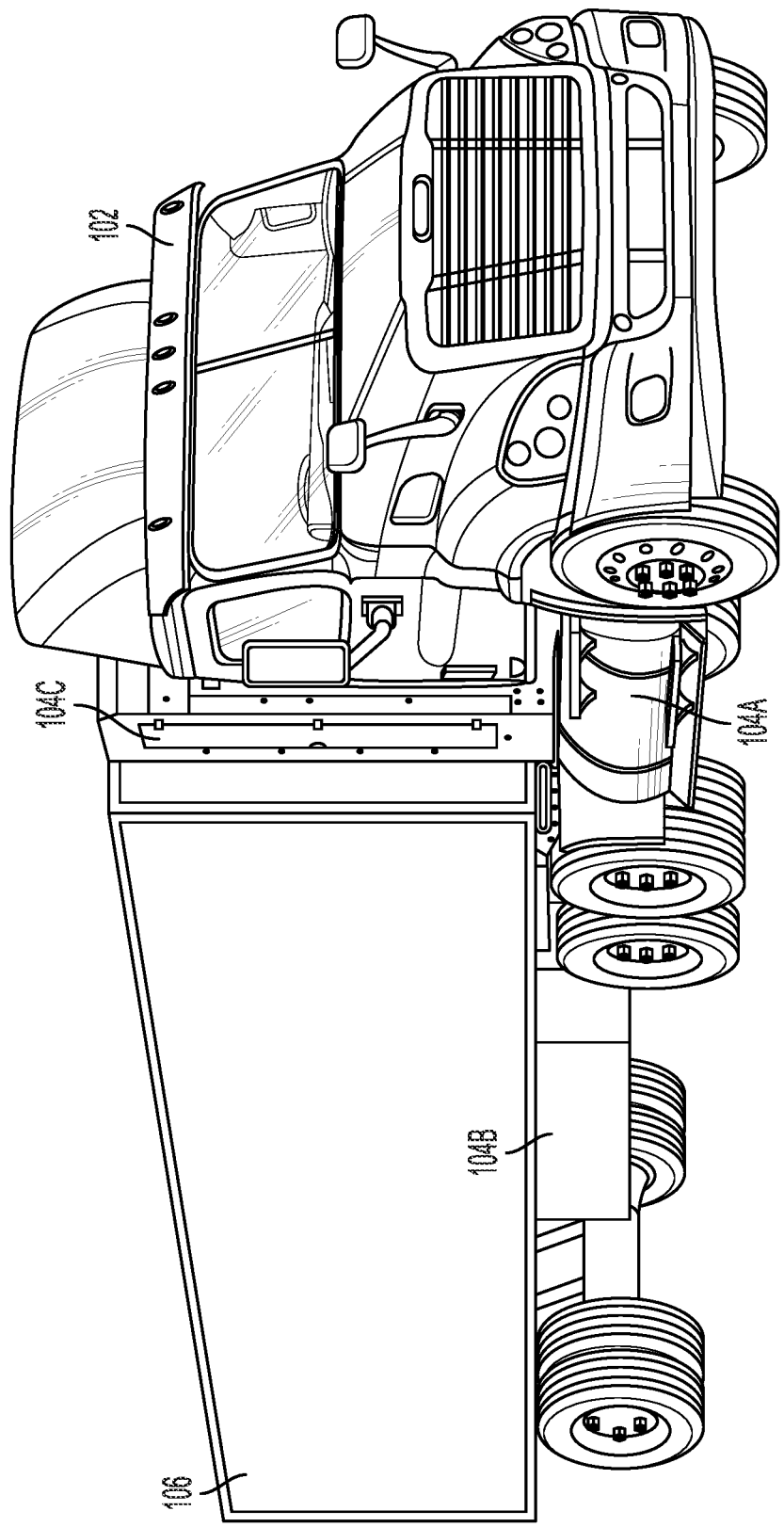
FIG. 1 illustrates a vehicle having composite cylinders storing fuel to power the vehicle, according to various embodiments.

FIG. 1 illustrates a vehicle 102. In particular, the vehicle 102 is a tractor configured to couple to and pull a trailer 106. The vehicle 102 may be powered using fuel stored in a composite pressure cylinder (or "composite cylinder" or "cylinder"). For example, the fuel may be compressed natural gas stored in a composite cylinder.

The cylinder may be part of a gas cylinder assembly. The gas cylinder assembly is in fluid communication with and supplies fuel to an engine or any other power generation system (e.g., a fuel cell system using hydrogen) of the vehicle 102. The vehicle 102 may be a car, a wagon, a van, a bus, a high-occupancy vehicle, a truck, a tractor trailer truck, a heavy-duty vehicle such as a garbage truck, or any other vehicle. In some embodiments, a gas cylinder assembly is configured for use in a ship, an airplane, and a mobile or stationary fuel station.

The fuel cylinders may be stored in a compartment or housing 104A on the sides of the vehicle 102, in a compartment or housing 104B on the trailer 106, or in a compartment or housing 104C behind the cab of the vehicle 102, for example. In some embodiments, the fuel cylinders may be stored on a rooftop or mounted to a tailgate of a vehicle.

Figure 2A:
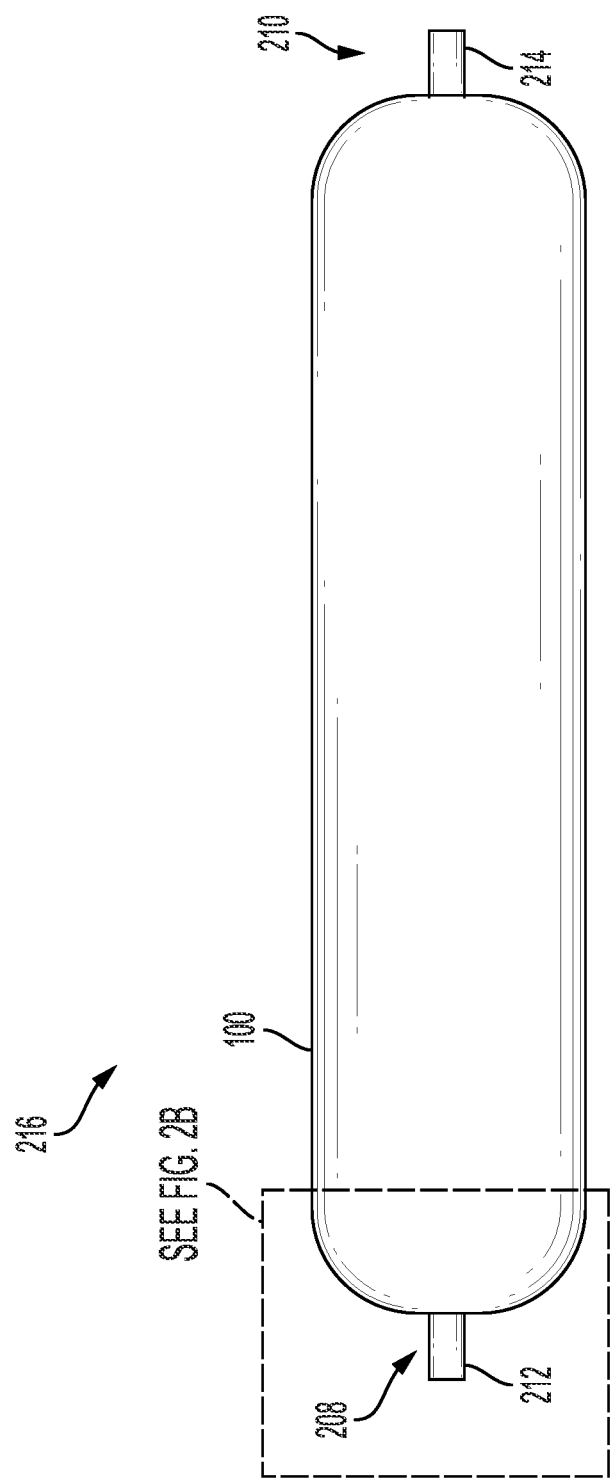
FIGS. 2A-2B illustrate a composite cylinder, according to various embodiments.

FIG. 2A illustrates a cylinder 100 configured to store a fluid, such as compressed natural gas or hydrogen. Cylinder 100 may be formed of a metal such as steel, aluminum, glass fiber, carbon fiber, polymer, or a composite material such as carbon fiber reinforced polymer, another suitable material, or a combination thereof. For example, the cylinder 100 may include an inner liner made of gas-tight, polyethylene plastic that has a high-pressure carbon fiber reinforced plastic structure located over the inner liner. In another example, the cylinder 100 may include a metal liner that is wrapped by a composite or fiber resin.

The cylinder 100 includes a central portion 216 and two end portions 208, 210. The central portion 216 may be a cylindrical tubular shape or any other shape. In some embodiments, each of the two end portions 208, 210 includes a dome structure. In some embodiments, the two end portions 208, 210 are symmetrical to each other. The dome structure may be generally hemispherical at least at the end portions thereof. In some embodiments, the two end portions 208, 210 have different shapes such that the cylinder 100 is of an asymmetrical shape.

In some embodiments, the cylinder 100 includes at least one boss 212, 214. The boss 212, 214 may include a neck projecting from the ends of the cylinder. A first boss 214 may have a bore that extends through the longitudinal length of the boss that provides an inlet and/or an outlet of an internal volume of the cylinder 100. A second boss 212 may not provide for an inlet and/or an outlet of an internal volume of the cylinder 100. The second boss 212 may have a bore that extends partially through the longitudinal length of the boss 212, or the second boss 212 may not have any bore at all. The second boss 212 may be referred to as a blind boss. The blind boss 212 may be used, along with the first boss 214, to mount the cylinder 100 within a storage area.

The boss 212, 214 can be made of any number of materials, such as metal. In some embodiments, the boss 212, 214 is formed using one or more materials not used for the internal pressure enclosure. In certain embodiments, the boss 212, 214 is made of the same material as the internal pressure enclosure.

Figure 2C:
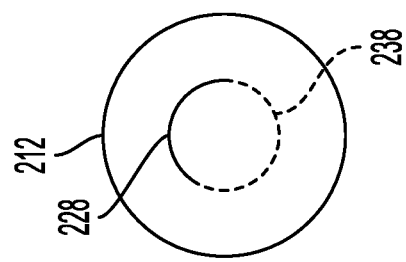
FIG. 2C illustrates a boss of the composite cylinder, according to various embodiments.
Figure 2B:
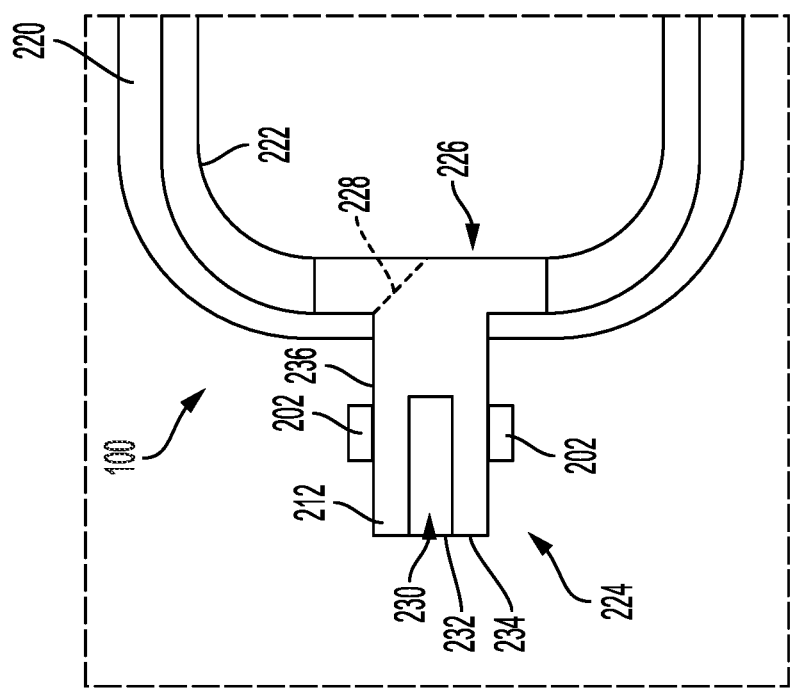

FIG. 2B illustrates a side cross-sectional view of the cylinder 100 at the second end 208 having the second blind boss 212. The cylinder 100 may have a plurality of layers. For example, the cylinder 100 may have an inner layer 222 and an outer layer 220. The inner layer 222 may be made of metal, plastic, or any other rigid material. The outer layer 220 may be made of a composite or fiber resin that is disposed on top of the inner layer 222 during the manufacturing process. While two layers (e.g., inner layer 222 and outer layer 220) are shown in FIG. 2B, any number of layers may be used to form the cylinder 100.

The boss 212 projects from the inner structure making up the inner layer 222, and the composite or fiber resin that is disposed on top of the inner layer 222 may also be disposed on top of the boss 212. A neck 224 of the boss 212 may be external to the cylinder 100 and exposed. The neck 224 may have a shape that is cylindrical, cuboid, or another prism having a different number of edges. The boss 212 may be coupled to the cylinder 100 by a flange 226 extending from the neck 224. The flange 226 may attached to the inner layer 222 and/or the outer layer 220 via any means, including adhesives and/or welding. The boss 212 may include a bore 230. The bore 230 may have an opening 232 at an exposed end 234 of the boss 212. The bore 230 may extend partially through the longitudinal length of the boss 212 as shown in FIG. 2B. In some embodiments, the bore 230 may extend partially or entirely through the longitudinal length of the neck 224. In some embodiments, the bore 230 may extend partially into the flange 226. In other embodiments, the boss 212 may not have a bore. The bore 230 may have a shape that conforms to the shape of the boss 212. For example, the bore 230 may have a shape that is cylindrical, cuboid, or another prism having a different number of edges. The boss 214 located on an opposite side of the cylinder 100 may mirror or have the same specifications as the boss 212, except the bore of the boss 214 extends entirely through the longitudinal length of the boss 214

In some situations, stress on the boss 212 may cause damage to one or more portions of the boss 212. For example, stress to the neck 224 of the boss 212 (e.g., a bending force exerted onto the neck 224) may cause the fracture 228 on the boss 212. The fracture 228 may extend from a neck 224 of the boss 212 to the flange 226 of the boss 212.

In some situations, the damage may result in a visible crack, but in many other situations, the damage may not result in a visible crack. This damage that is not easily visible to a human eye may be as damaging to the cylinder 100 as visible damage. The systems and methods described herein prevent re-use of cylinders that have damage, including cylinders with damage that is not easily visible to the human eye.

The cylinder 100 may have a plurality of sensors 202 attached to the boss 212 at various sensor locations. The sensors 202 are configured to detect fracturing events at the boss 212. The sensors 202 may be broadband piezoelectric sensors which are sensitive to the out-of-plane displacement of the material used to make the boss. The broadband piezoelectric sensors utilize a piezoelectric material in communication with the boss to measure stress waves caused by a fracture (or cracking) event or a rubbing event at a location of an established fracture (or crack).

The sensors 202 may be considered passive sensors in that one or more of the sensors do not actively emit a wave to be detected by one or more other sensors. Instead, the sensors 202 may be used to determine when, where on the boss, and to what severity a cracking event occurred. In some embodiments, the sensors 202 may continuously, passively monitor the boss 212 to detect when the boss 212 is stressed from an external source.

There may be two or more sensors 202 coupled or attached to the boss 212. For example, there may be two sensors 202 as shown in FIG. 2B. In other embodiments, there may be four sensors 202, eight sensors 202, sixteen sensors 202, or any other even number of sensors 202. Each sensor 202 may be positioned directly across or diametrically opposite from another sensor 202 around the boss 212. Particularly, the sensors 202 may be located on an outer surface 236 of the neck 224 of the boss 212. In some embodiments, the sensors 202 are removably attached to the boss 212. In other embodiments, the sensors 202 are permanently attached to an outer surface of the boss 212. In other embodiments, the sensors 202 are integrally formed and embedded within the boss 212. In some embodiments, the sensors 202 may be coupled or attached directly onto the outer surface 236. In some embodiments, the sensors 202 may be coupled or attached to a collar 320 (see FIG. 3A), and the collar 320 may be positioned over the neck 224.

FIG. 2C illustrates a view of the boss 212 facing the flange 226 of the boss 212. The fracture line 228 may form in a circular shape corresponding to the neck 224 of the boss 212. The fracture line 228 may be a semicircle or any portion of a circle, or may be any other shape along the flange 226 of the boss 212. A fracture of any kind is deleterious to the integrity of the boss 212 and the cylinder 100 at large. If the fracture 228 continues to grow and expand (e.g., along dashed line 238) to form a closed shape, the neck 224 of the boss 212 may separate from the flange 226 of the boss 212, which would be undesirable.

Figure 3B:
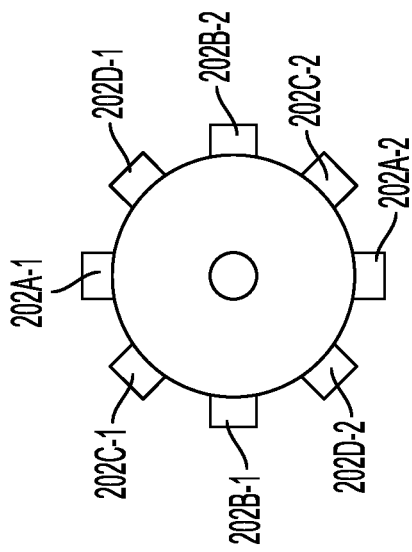
FIGS. 3A-3B illustrate sensors used to detect cracking in the boss, according to various embodiments.
Figure 3A:
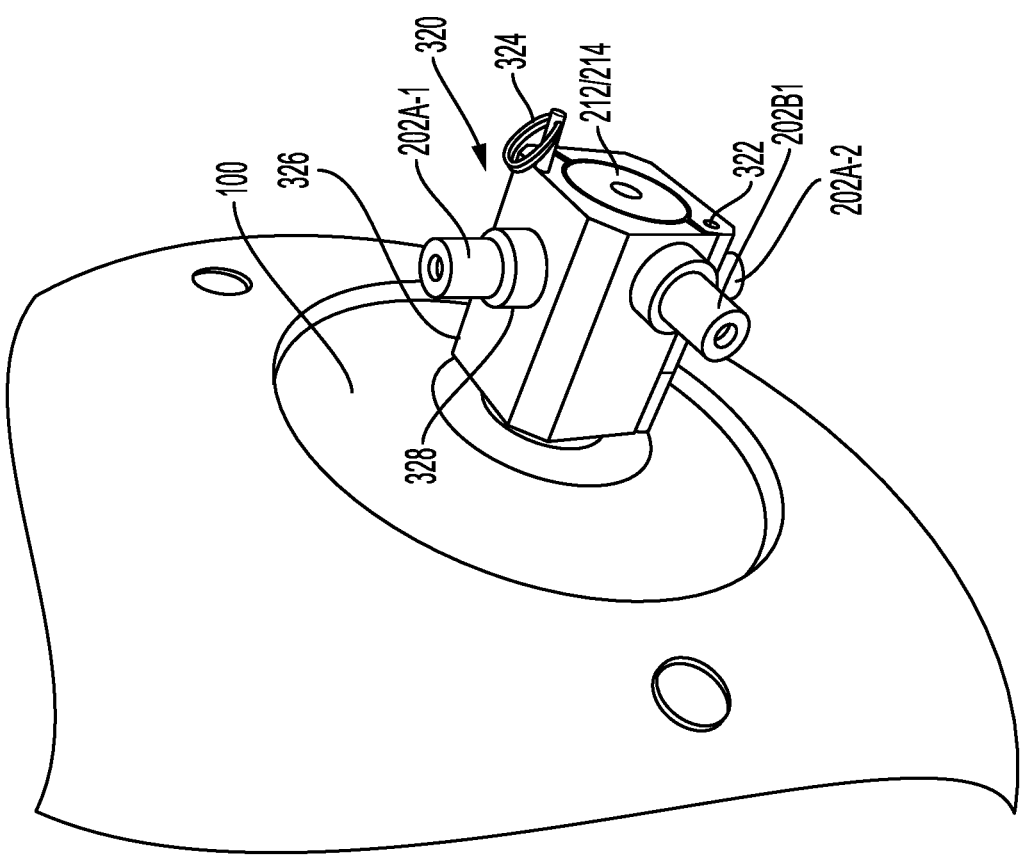
Figure 5A:
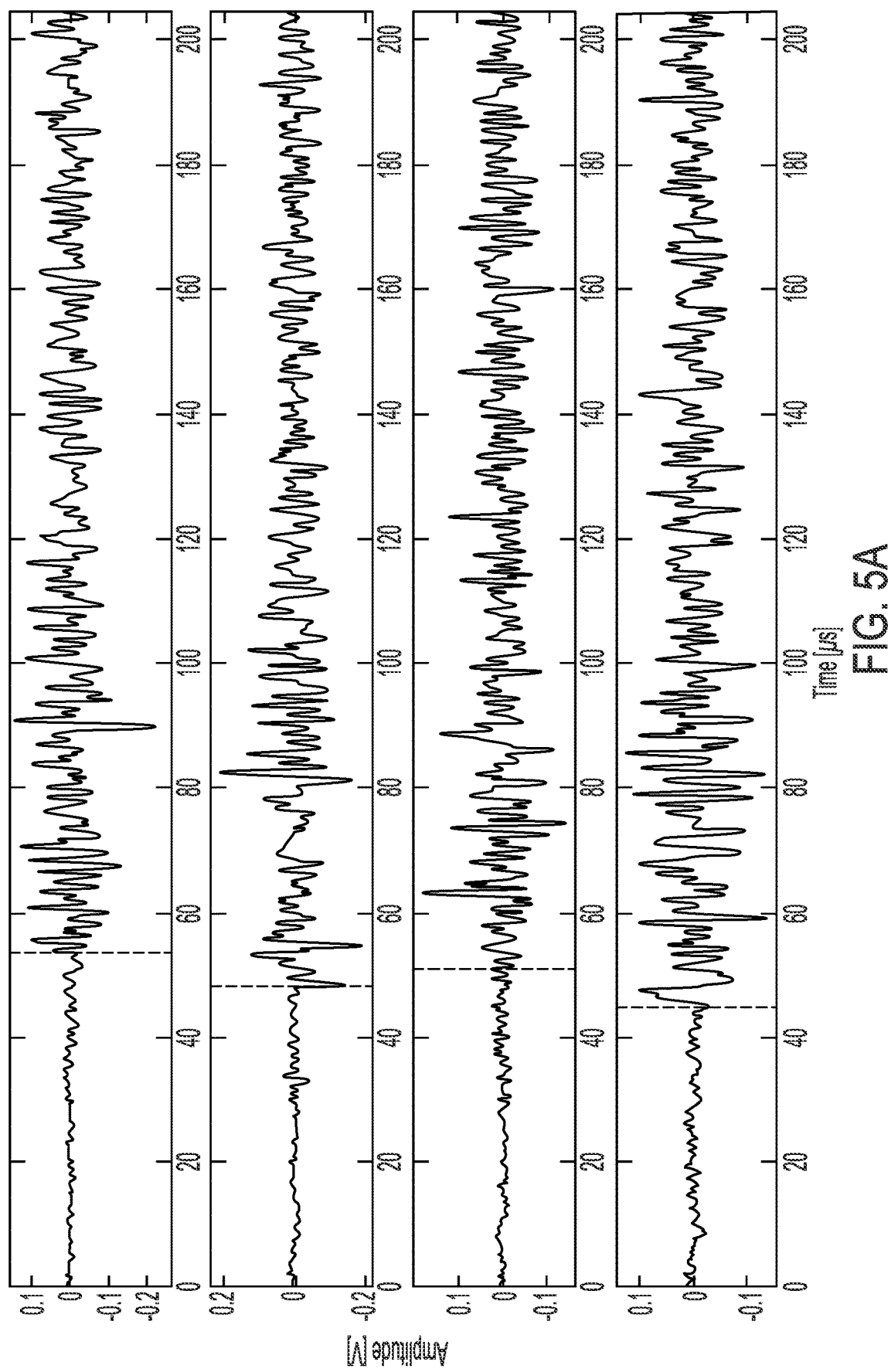
Figure 5B:
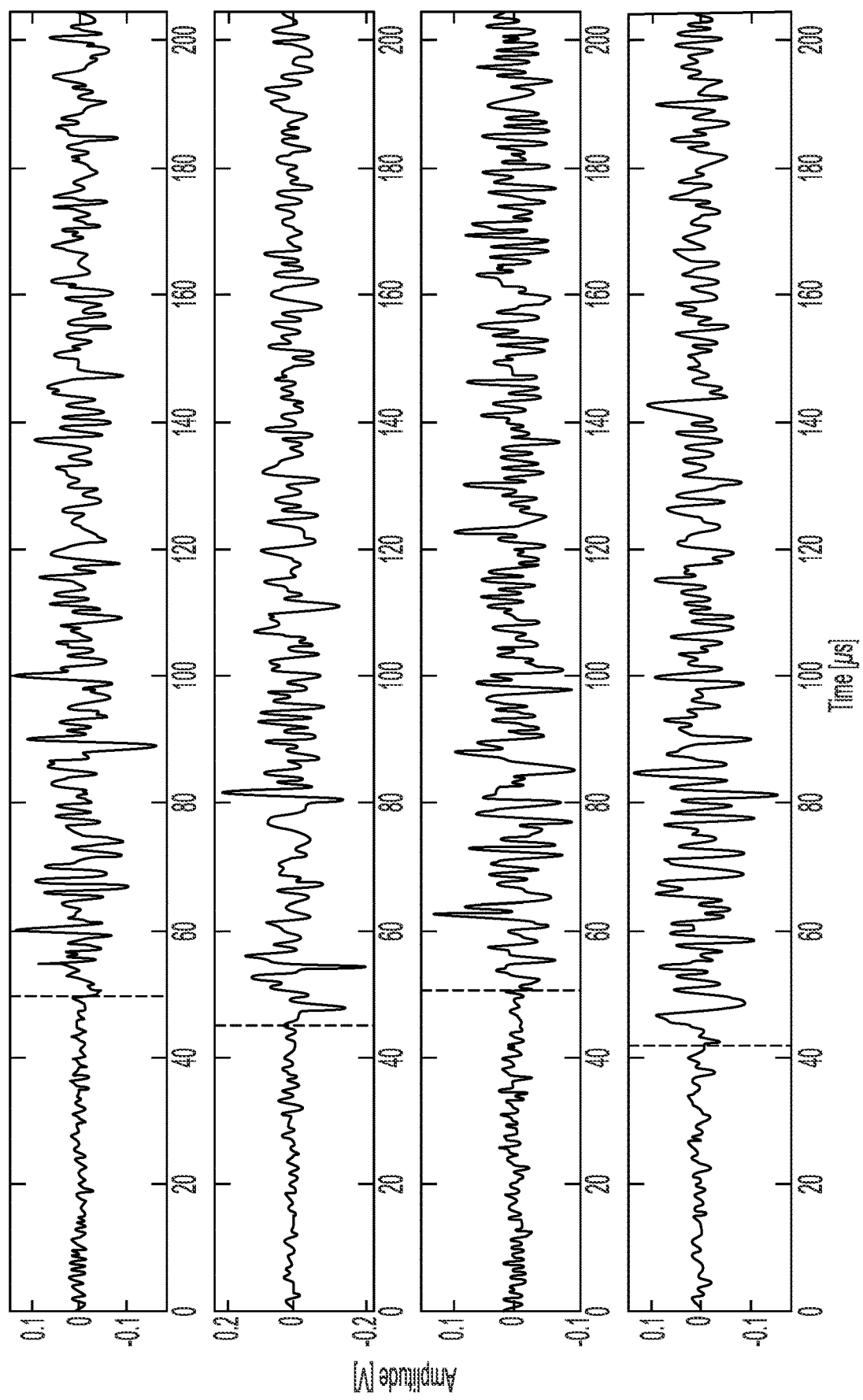
Figure 5C:
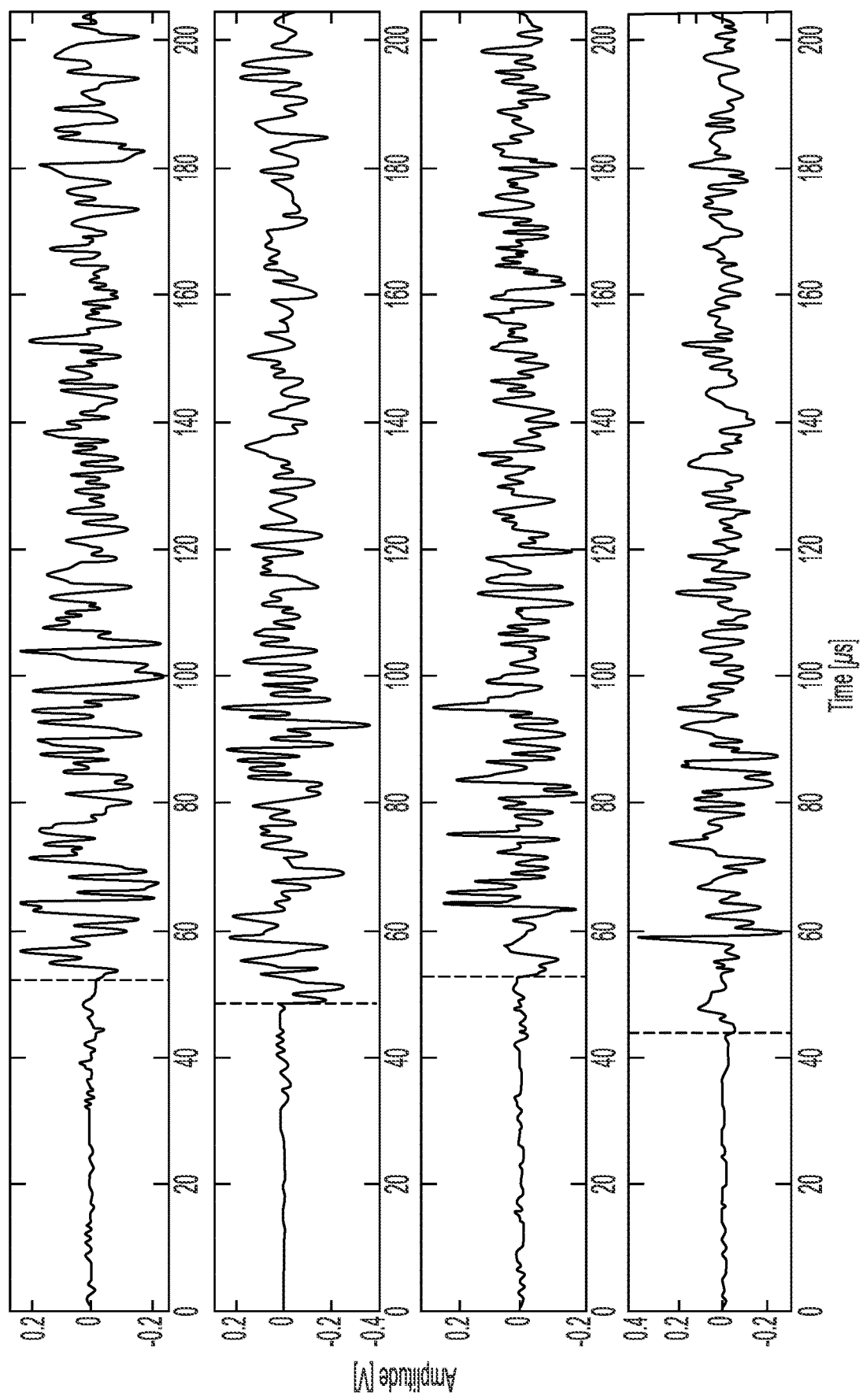
Figure 5D:
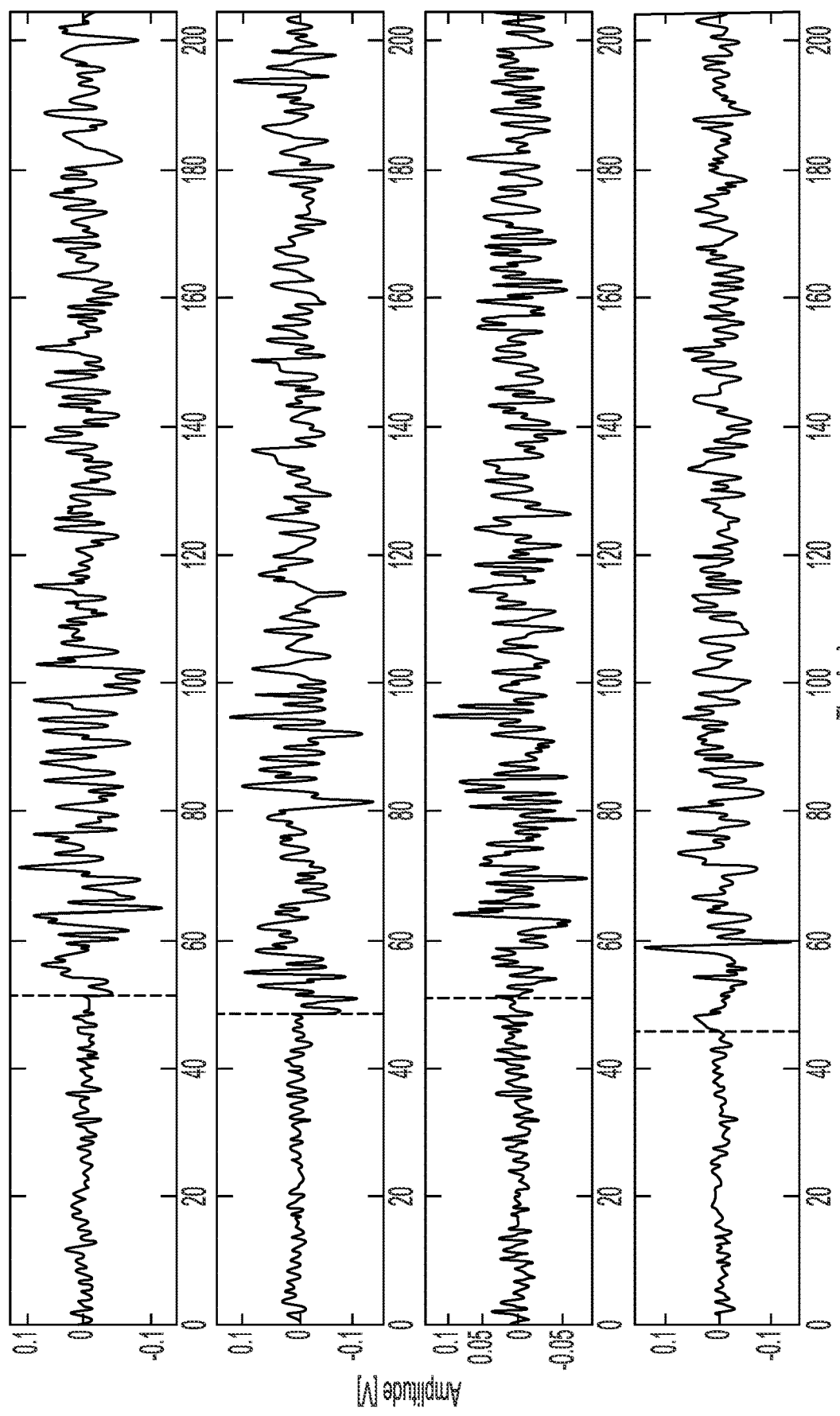

FIGS. 3A-3B illustrate sensors 202 used to detect cracking in the boss 212/214, according to various embodiments. The boss 212/214 of the cylinder 100 may be damaged. For example, the cylinder 100 may be damaged during installation of the cylinder 100 or during use of the vehicle 102. When a fatigue crack in a boss 212/214 extends, ultrasonic waves are emitted and the boss 212/214 acts as a wave guide. When the crack in the boss 212/214 closes (following crack extension), ultrasonic waves may also be emitted, and these events may also be capable of detection, similar to detection of boss cracking events.

Based upon the geometry of the boss 212/214 and the ultrasonic wavelengths which propagate, both bulk ultrasonic (i.e., longitudinal and shear) and guided ultrasonic rod (i.e., extensional, flexural, and torsional) may propagate. Given the complex nature of the structure being monitored, a number of additional source mechanisms outside of fatigue crack extension are possible (e.g., fiber fracture, matrix cracking, delamination, stiction events between material component interfaces— boss/liner or liner/composite). A number of features of the detected waveforms are leveraged to improve the identification of crack extension and to reduce false indication calls.

The sensors 202 may be strategically positioned on the boss 212/214 at quadratures of the boss as shown in FIGS. 3A and 3B. Because fatigue crack extension is a dipole source and two pairs of sensors (e.g., sensors 202A-1 and 202A-2; sensors 202B-1 and 202B-2; sensors 202C-1 and 202C-2; sensors 202D-1 and 202D-2) are 180° opposing one another, such a sensor configuration results in phase inversion of the direct arriving pseudo longitudinal/extensional wave mode component between the two opposing sensors. One portion of the boss 212/214 may be put into tensile wave propagation, and another portion of the boss 212/214 may be put into a compressed mode.

The sensors 202 may be coupled or attached to a collar 320 positioned over the boss 212/214. The collar 320 may be made of metal, plastic, wood, and/or the like. The collar 320 may have a bore or opening configured to receive the boss 212/214. The bore or the opening may conform to the shape of the outer surface 236 of the neck 224 of the boss 212/214. In some embodiments, the collar 320 may be a unitary construction. In some embodiments, the collar 320 may comprise multiple parts as shown in FIG. 3A. The multiple parts may be attached together by conventional adhesives or fasteners, such as one or more pins 322 shown in FIG. 3A. The one or more pins 322 may include a ring 324 or a handle, grip, or extension to push and pull the pins 322 about a pinhole to latch and unlatch the collar 320. When the collar 320 is unlatched, the collar 320 may be removed or disconnected from the boss 212/214. The collar 320 may be coupled or attached to the boss 212/214 by positioning the collar 320 over and around the boss 212/214 and latching the collar 320 onto the boss 212/214 via the pins 322 to secure the collar 320 onto the boss 212/214.

The collar 320 may have a shape that is cylindrical, cuboid, or another prism in the latched position. Edges of the collar 320 may be chamfered as shown in FIG. 3A or filleted. An outer surface 326 of the collar 320 may include sensor docks 328 configured to receive the sensors 202. The sensor docks 328 may extend from the outer surface 326 or attached to the outer surface 326 via conventional adhesives or fasteners. The sensor docks 328 may have a shape that is cylindrical, cuboid, or another prism. The sensor docks 328 may have openings or bores that receive the sensors 202. The openings or bores may conform to the shape of the sensors 202.

While FIG. 3B illustrates four pairs of sensors (e.g., sensors 202A-1 and 202A-2; sensors 202B-1 and 202B-2; sensors 202C-1 and 202C-2; sensors 202D-1 and 202D-2) any even number of sensors 202 located opposite each other may be used. A greater number of sensors may result in greater accuracy of the system.

The size of the detecting area of the sensors 202, referred to as the aperture of the sensors 202, may be carefully chosen based on the material of the boss 212/214 and/or the size of the boss 212/214. When the aperture is too large, some of the signals received by the sensor may be cancelled by other signals having an opposite phase. When the aperture is too small, the sensor may not be sufficiently sensitive to all of the signals. In some embodiments, the aperture of the sensors 202 is between ⅛ of an inch to ¼ of an inch.

FIG. 4 illustrates traces of four sensors 202A-1, 202B-1, 202A-2, and 202B-2, where sensors 202A-1 and 202A-2 are located opposite each other along the circumference of the boss 212/214, and sensors 202B-1 and 202B-2 are located opposite each other along the circumference of the boss 212/214. The phase inversion of the detected direct arriving pseudo longitudinal/extensional wave mode component between the two opposing sensors described above is shown by comparing the traces of sensor 202B-1 and 202B-2 in FIG. 4. The phase of the front end arrival on the traces of sensor 202B-1 and 202B-2 are 180° out of phase with respect to one another. The aforementioned feature may be used as one factor in identifying crack extension.

The next feature to be leveraged is consistency within inter-channel arrival time differences ($\Delta t$). As a fatigue crack is discrete in nature and exists in a defined location on the boss 212/214, the arrival time differences will be highly consistent for incremental crack extension. Typically, arrival time differences are input into a mathematical model and the velocity of the ultrasound propagation is utilized to determine the location of the source. If the geometry of the boss 212/214 were known, source location would be possible, however, source location is not necessary, as similarity in arrival time differences is adequate to confirm that a source is emitting from a highly similar physical location.

As an example, FIGS. 5A-5D show representative waveforms that are a part of the deformation data detected by each sensor 202. The waveforms are a result of a crack extension event detected at each channel, with the arrival time of the waveform indicated by a vertical dashed line. The waveform arrival times exhibit a highly consistent pattern of inter-channel arrival time difference behavior. Thus, when the waveform arrival times detected by the sensors are within a threshold time of each other (i.e., when a difference between arrival times is less than a threshold time), a boss cracking event may be detected. The time range between arrival times that trigger the determination of consistent arrival times may be based on the geometry and/or the size of the boss 212/214.

Figure 6A:
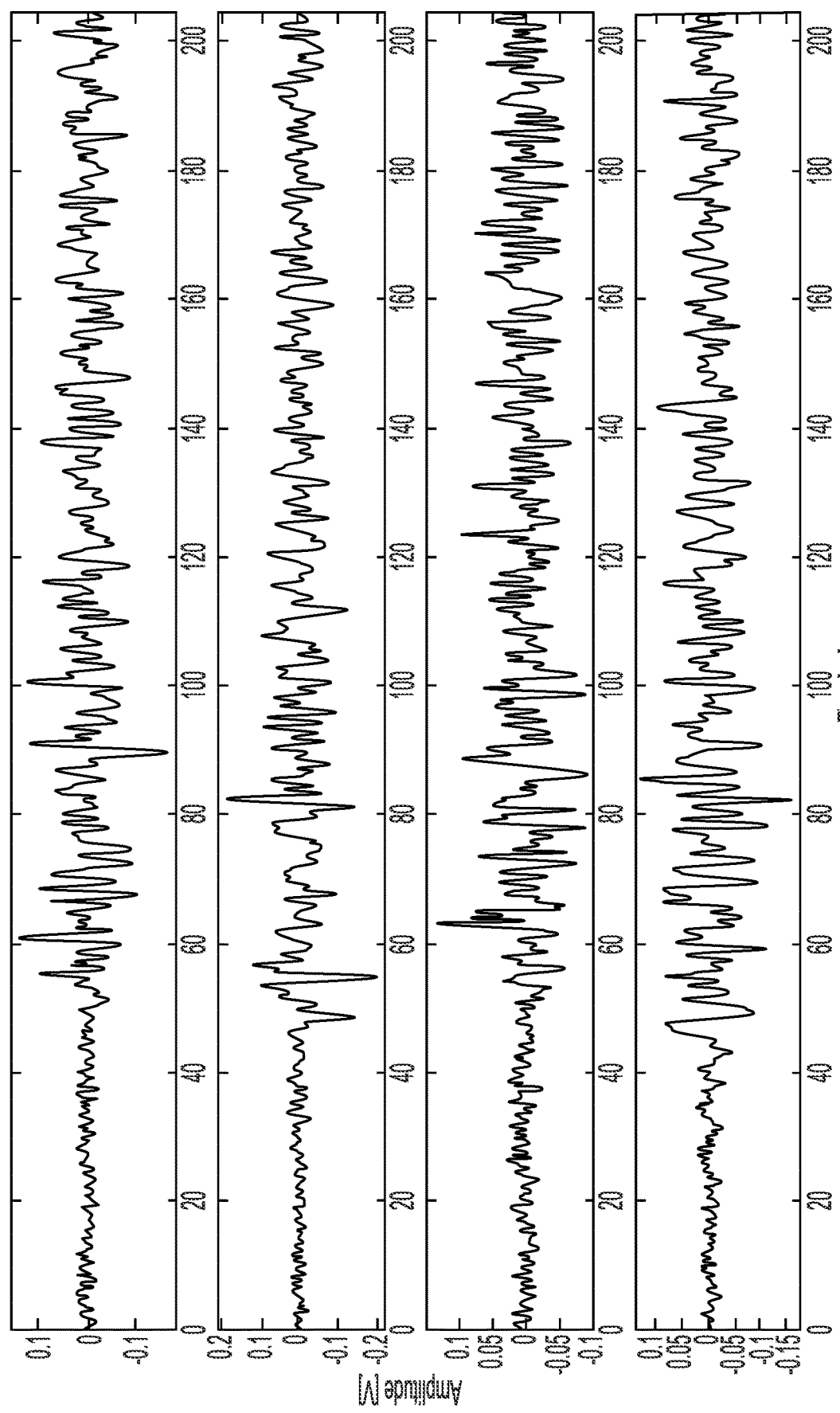
Figure 6B:
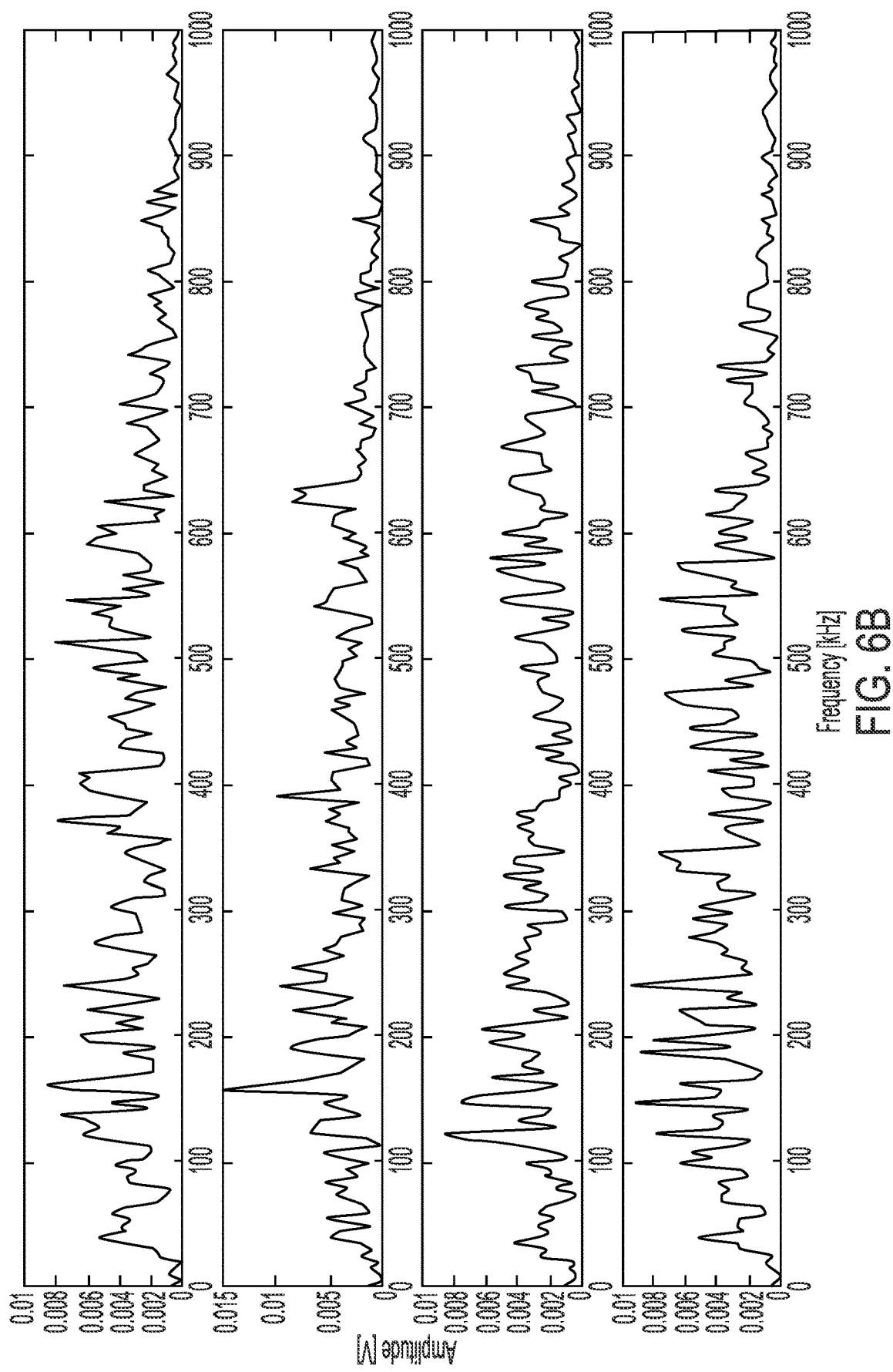
Figure 7A:
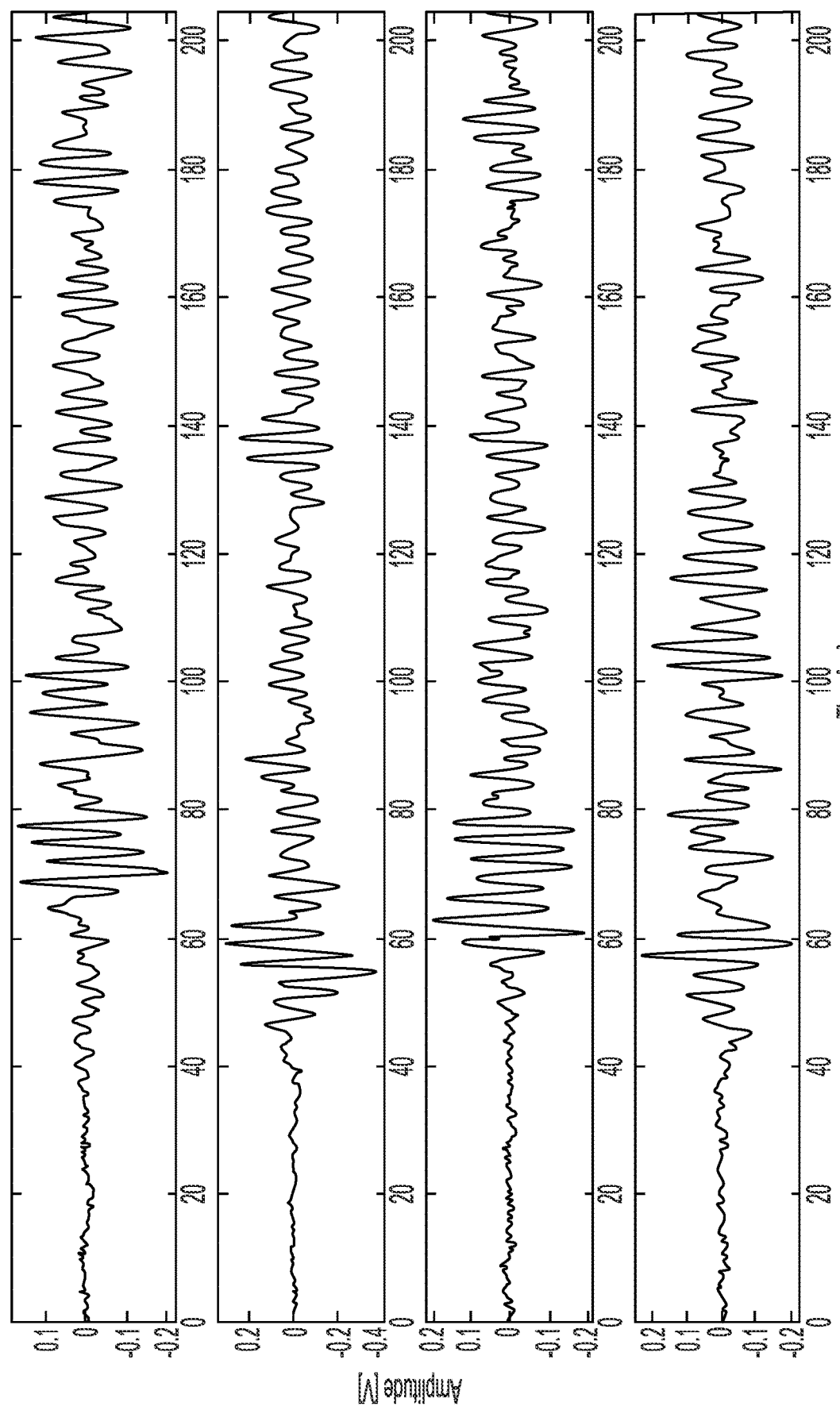
Figure 7B:
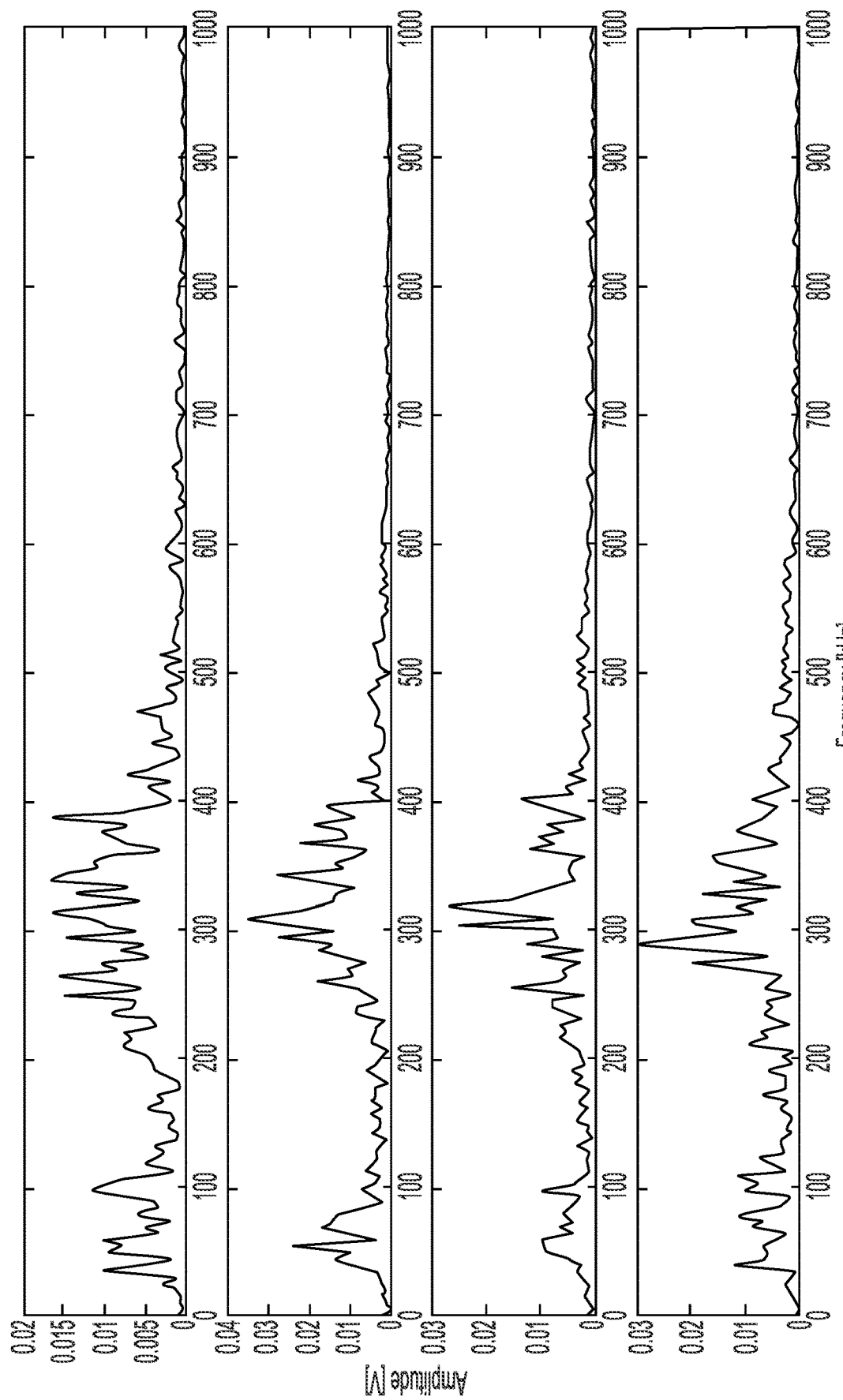
Figure 8:
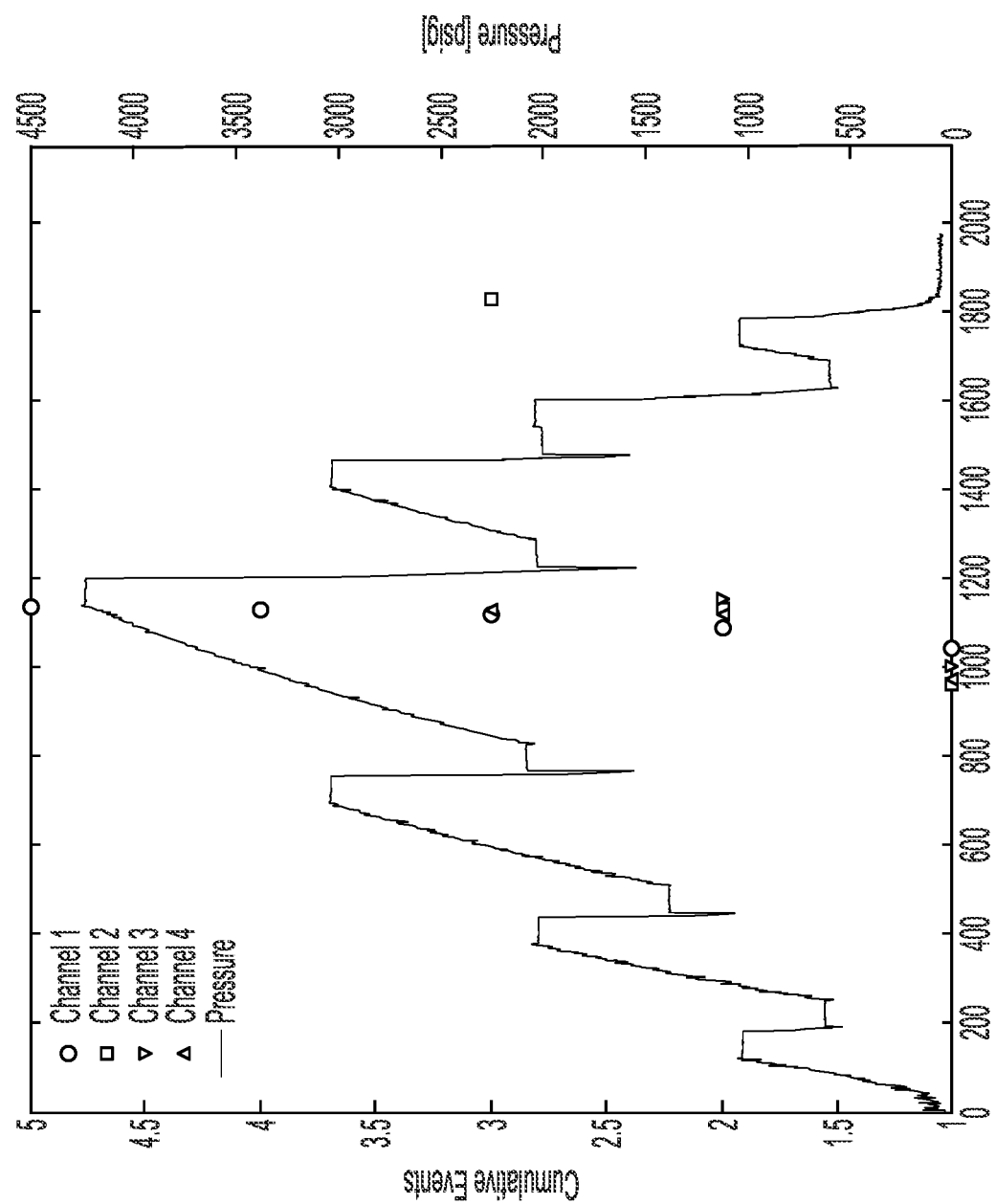

The final pieces of information leveraged would be the design of a loading scheme intended to generate both crack extension (occurring at high stress intensity factor ($\Delta K$) levels with waveforms possessing higher frequency content due to the short duration brittle fracture), as well as frictional rubbing between existing fracture surface events occurring at low $\Delta K$ levels following the application of a large tensile stress (with waveforms possessing lower frequency content due to the longer duration of frictional sliding). FIGS. 6A-6B provide an example of waveforms and frequency spectra from a crack extension event, whereas FIGS. 7A-7B provide waveforms and frequency spectra from a frictional rubbing event. FIG. 8 provides a double y-axis plot; the left hand y-axis is cumulative events by first detecting channel, the right hand y-axis is internal pressure within a Type 4 COPV, and the x-axis is time. From FIG. 8, it can be observed that the crack extension events were all detected at high $\Delta K$ levels for the 3600 psi service pressure vessel, while one crack face rubbing frictional event was detected on the final depressurization (low $\Delta K$ level).

High $\Delta K$ levels and low $\Delta K$ levels may vary based on the material of the boss 212/214. In general, high $\Delta K$ levels may be observed where the loading is above a threshold $\Delta K$ level, or $\Delta K_{TH}$, and low $\Delta K$ levels may be observed where the loading is below $\Delta K_{TH}$.

Figure 9:
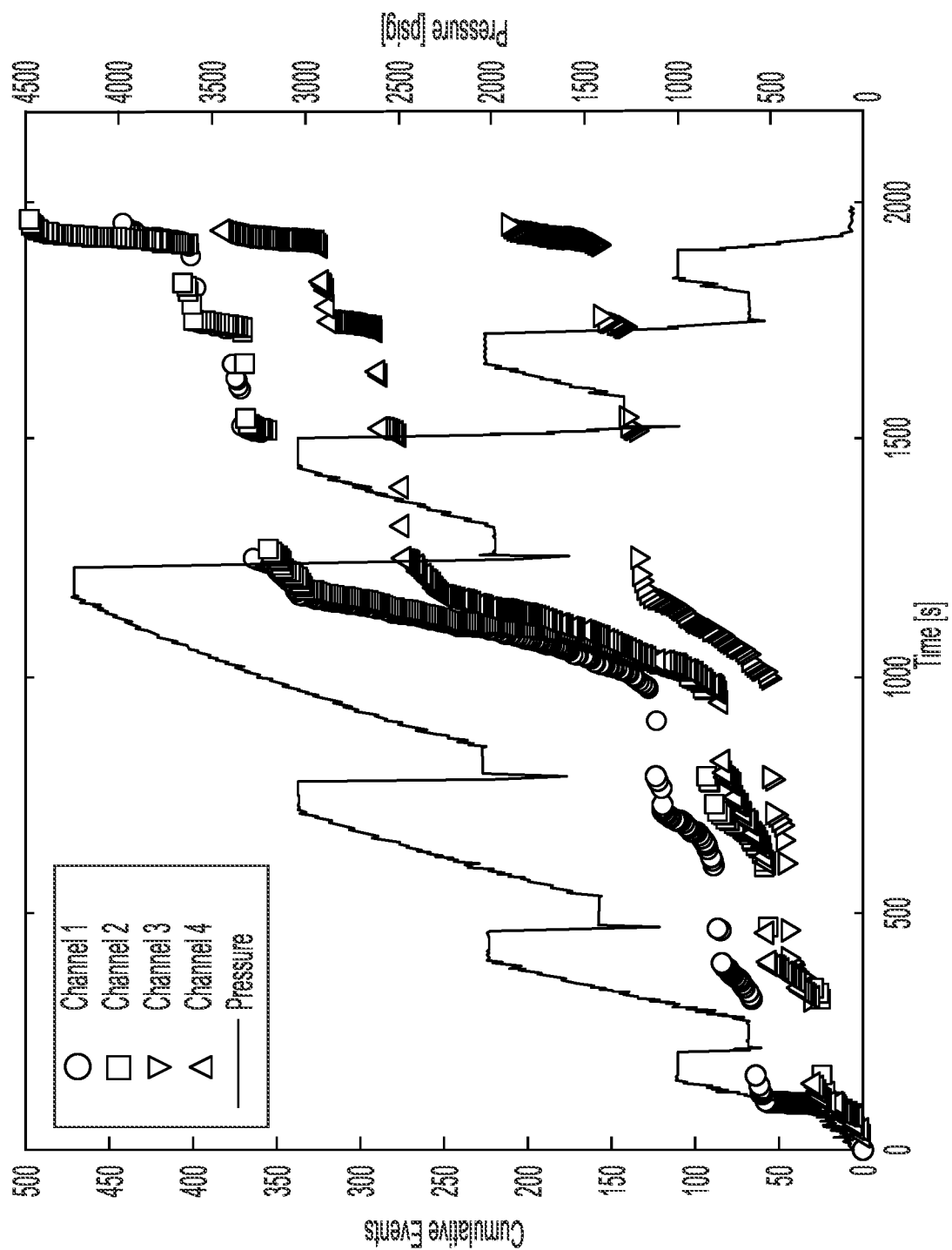
Figure 10:
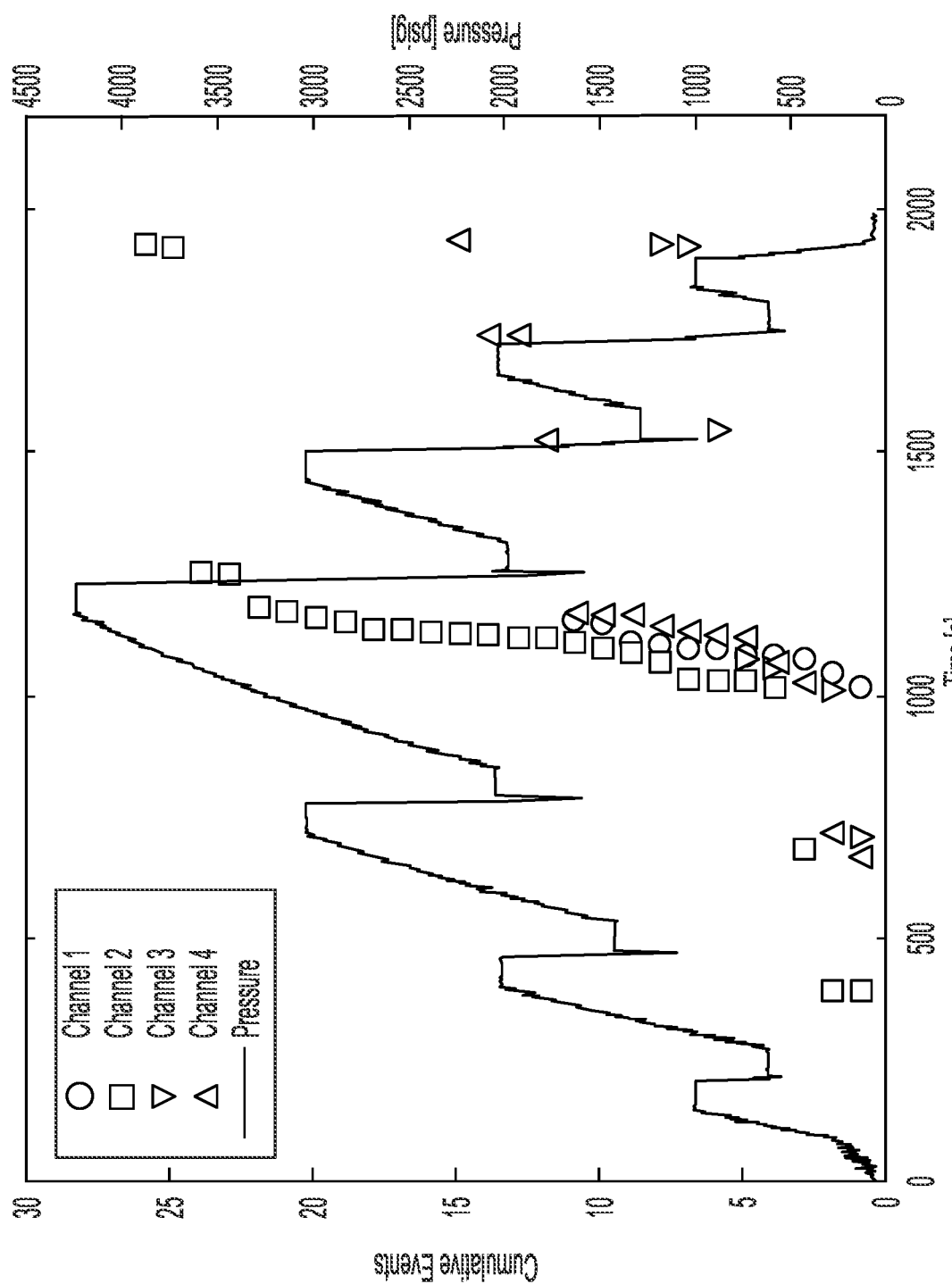

FIG. 9 illustrates all detected events from the sensors 202. FIG. 10 illustrates identification of boss cracking events from among all of the detected events using the methods described herein. As illustrated by FIGS. 9 and 10, the systems and methods described herein are capable of efficiently and accurately detecting boss cracking events.

In some embodiments, use of MAE and the sensors arranged as described herein allows for the identification of the boss cracking events from among all of the detected events by virtue of the data detected using MAE.

Figure 11A:
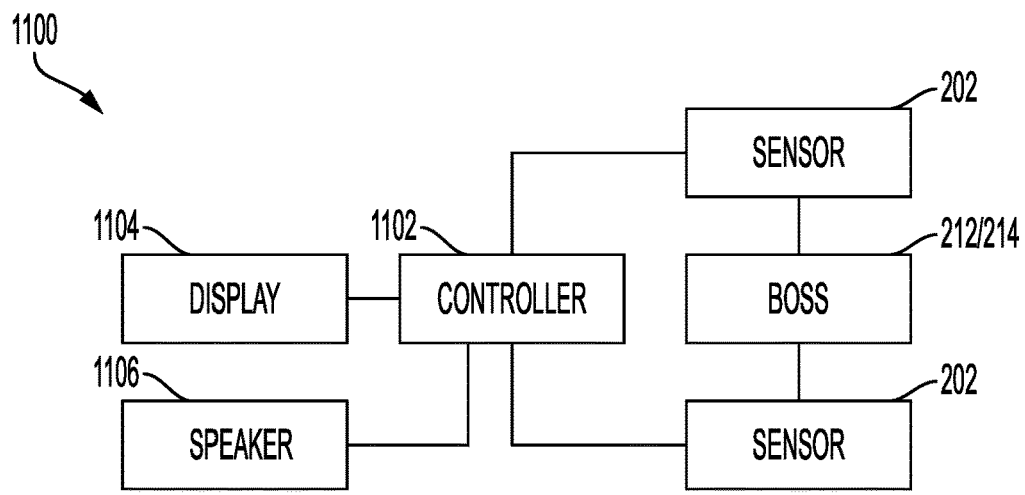
FIGS. 11A-11B illustrate block diagrams of boss cracking detection systems, according to various embodiments.

FIG. 11A illustrates a block diagram of components that may be coupled to the boss 212/214. The system 1100 includes the boss 212/214 and sensors 202, as described herein. The sensors 202 are physically coupled to the boss 212/214, also as described herein.

The sensors 202 may be communicatively coupled to a controller 1102 (or "boss controller" or "boss-side controller" or "cracking monitoring controller"). The sensors 202 may be configured to detect deformation data associated with a fracture event received (or experienced) by the boss 212/214. As used herein, "deformation data" may be used to refer to the deformation of the boss 212/214. In this regard, "cracking data," "fracture data," or "boss integrity data," among others, may be used interchangeably with "deformation data."

The deformation data may be provided to the controller 1102. The controller 1102 may be a computer processor, microprocessor, control unit, or any device configured to execute instructions stored in non-transitory memory. The controller 1102 may be located in a housing that is physically coupled to the cylinder 100 (e.g., located directly on the cylinder 100, on a housing of the cylinder 100, or on a device coupled to the cylinder 100). While FIG. 11A shows the controller 1102 coupled to only one pair of sensors 202 coupled to boss 212/214, the controller 1102 may be coupled to additional pairs of sensors for monitoring other bosses or additional pairs of sensors for the boss 212/214.

The sensors 202 may be communicatively coupled to the controller 1102 via wires, or in a wireless manner, using respective transceivers (e.g., a transceiver for each sensor 202 and a transceiver for the controller 1102). While a pair of sensors 202 are shown, any number of sensors 202 may be included in the system 1100 to monitor the boss 212/214, and each sensor 202 may be communicatively coupled to the controller 1102.

The controller 1102 may also be communicatively coupled to a display 1104 and/or a speaker 1106. The controller 1102 may be configured to render a graphical user interface displayed by the display 1104. The graphical user interface may include notifications that the boss 212/214 is compromised, and the display 1104 may display these notifications. Similarly, a speaker 1106 may emit a noise, alarm, spoken words, or any other indication.

Figure 11B:
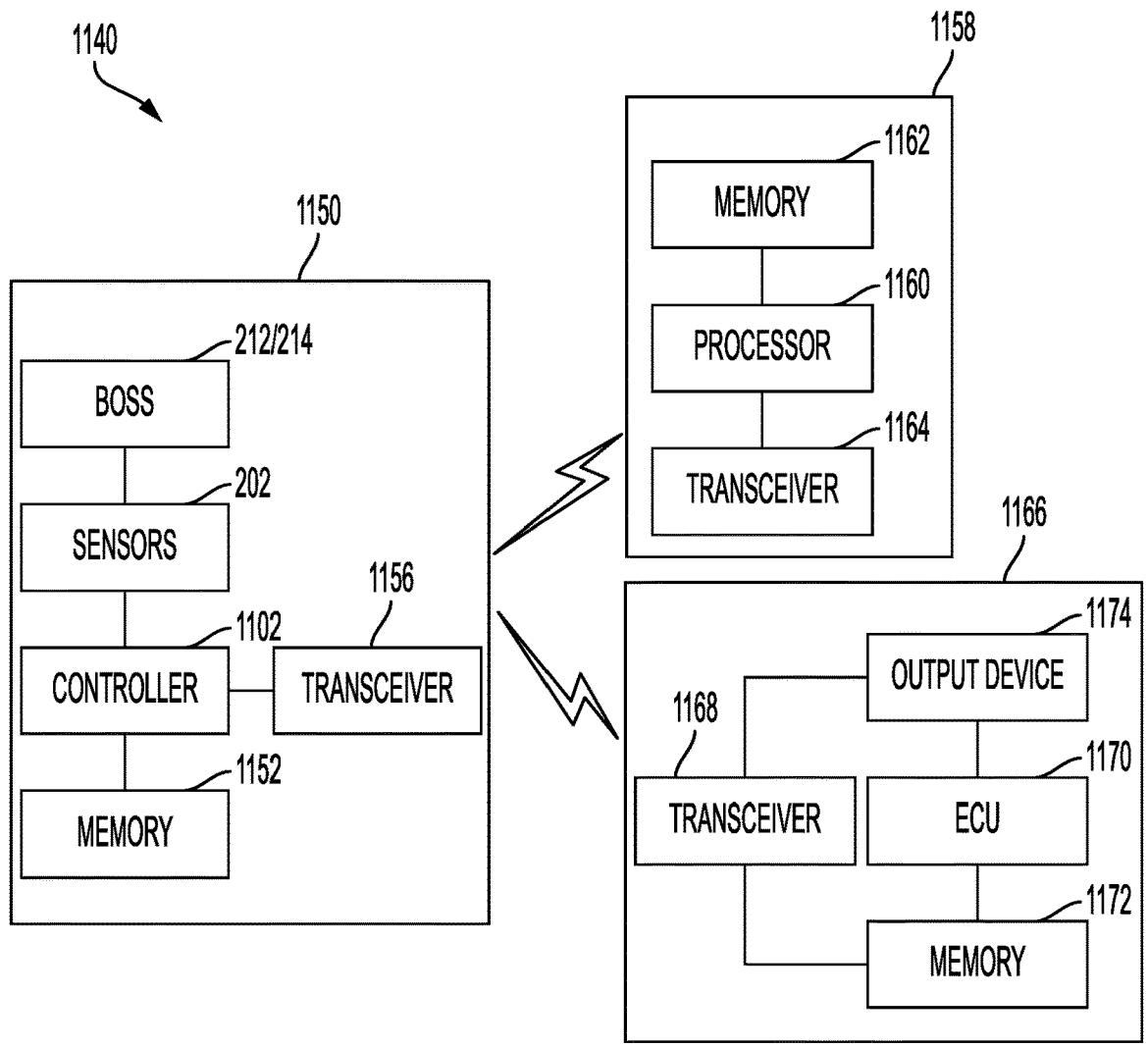

FIG. 11B illustrates an example system 1140, according to various embodiments of the invention. The system 1140 includes boss 212/214, sensors 202, and controller 1102, each as described herein. As described herein, the sensors 202 are configured to detect deformation data of the boss 212/214 and communicate the deformation data to the controller 1102. The sensors 202 may be broadband piezoelectric sensors or any other potentially suitable sensors (e.g., fiber Bragg grating, non-contact laser, etc.) configured to detect deformation of the boss 212/214. Also as described herein, the controller 1102 is configured to detect boss cracking events (e.g., crack extension or crack closure) based on the deformation data. Crack closure may also be referred to as crack face rubbing and occurs after the crack is extended and both free surfaces of the extended crack make contact with one another.

The system 1140 also includes a memory 1152 coupled to the controller 1102. The memory 1152 may be a non-transitory memory configured to store instructions for execution by the controller 1102, which may be a computer processor, such as a microprocessor or microcontroller. The memory 1152 may also store data such as deformation data detected by the sensors 202 or a state of the boss 212/214, for example. The state of the boss 212/214 may be represented in multiple tiers (e.g., 2 tiers, 3 tiers, 4 tiers) each associated with a word (e.g., "normal," "needs inspection," "damaged") or number (e.g., 1, 2, 3, 4).

If a boss cracking event is detected, the controller 1102 is configured to provide an indication that damage has been experienced by the boss 212/214. The indication may be provided to any number of devices, such as an ECU of the vehicle 102, a local non-transitory memory, or a remote non-transitory memory.

When the indication is provided to a local non-transitory memory 1152, the controller 1102 may update, on the local non-transitory memory 1152, a state indication associated with each boss 212/214 of the vehicle 102, and the state indication may be changed from a first state corresponding to a non-damaged condition of the boss to a second state corresponding to a potentially damaged condition of the boss. The local non-transitory memory 1152 may be accessed by another device (e.g., a computing device of a maintenance facility) to determine whether the boss 212/214 should be inspected. In some embodiments, refilling of the cylinder 100 may be automatically prevented when there is an indication of potential damage to the boss 212/214.

Similarly, when the indication is provided to a remote non-transitory memory, the controller 1102 may update, on the remote non-transitory memory, a state indication associated with each of the bosses 212/214 of the vehicle 102, and the state indication may be changed from a first state corresponding to a non-damaged condition of the boss to a second state corresponding to a potentially damaged condition of the boss. The remote non-transitory memory may be accessed by another device (e.g., a computing device of a maintenance facility) to determine whether the boss 212/214 should be inspected. In some embodiments, refilling of the cylinder 100 may be automatically prevented when there is an indication of potential damage to the boss 212/214.

The system 1140 also includes a transceiver 1156 coupled to the controller 1102. The controller 1102 may use the transceiver 1156 to couple to a network such as a local area network (LAN), a wide area network (WAN), a cellular network, a digital short-range communication (DSRC), the Internet, or a combination thereof.

The transceiver 1156 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 1156 may transmit data to and receive data from devices and systems not directly connected to the controller 1102. For example, the controller 1102 may communicate wirelessly with a remote data server 1158 and/or a vehicle 1166 (e.g., vehicle 102). Furthermore, the transceiver 1156 may access the network, to which the remote data server 1158 and the vehicle 1166 are also connected.

The ECU 1170 of the vehicle 1166 may control one or more output devices 1174 of the vehicle 1166, including an indicator light, display screen, speaker, or other notification device for alerting a driver or user when the controller 1102 detects damage to the boss 212/214, as described herein. The controller 1102 may communicate with the ECU 1170 of the vehicle via wires or via the transceiver 1156, with the ECU 1170 being coupled to its own respective transceiver 1168. In this regard, the ECU 1170 may also be coupled to its own non-transitory memory 1172 similar to memory 1152.

The boss 212/214, sensors 202, controller 1102, memory 1152, and transceiver 1156 may be collectively referred to as a boss monitoring device 1150. The boss monitoring device 1150 may be physically located on a vehicle (e.g., vehicle 102). In some embodiments, "boss monitoring device" may refer to the sensors 202, controller 1102, memory 1152, and/or transceiver 1156, with the boss 212/214 being separate from the boss monitoring device. Although FIG. 11B illustrates various elements connected to the controller 1102, the elements of the boss monitoring device 1150 may be connected to each other using a communications bus.

The controller 1102 may communicate the deformation data from the sensors 202 and/or an update to the state of the boss 212/214 to a remote data server 1158. The remote data server 1158 may include a processor 1160, a memory 1162, and a transceiver 1164. The processor 1160 may be any computing device configured to execute instructions stored in a non-transitory memory. The memory 1162 may be similar to memory 1152 and configured to store instructions for execution by the processor 1160 as well as deformation data detected by the sensors 202 or a state of the boss 212/214, for example.

The transceiver 1164 is similar to transceiver 1156 and is configured to transmit and receive data from one or more other devices, such as the boss monitoring device 1150 and the vehicle 1166.

In some embodiments, instead of the controller 1102 performing determinations based on the deformation data from the sensors 202, the processor 1160 may receive the deformation data and perform one or more of the responsibilities of the controller 1102 described herein. In these embodiments, it may be computationally more efficient to communicate the deformation data detected by the sensors 202 to the remote data server 1158 (via respective transceivers 1156, 1164) for processing by the processor 1160 than having the controller 1102 perform the processing.

While one remote data server 1158 is shown, there may be a plurality of remote data servers 1158 configured to distribute the computational load to improve computational efficiency. In some embodiments, the remote data server 1158 may be any device capable of communicating with the boss monitoring device 1150 and capable of performing computer processing, such as an ECU of the vehicle or a mobile device (e.g., a smartphone, laptop, tablet).

As used herein, a "unit" may refer to hardware components, such as one or more computer processors, controllers, or computing devices configured to execute instructions stored in a non-transitory memory.

Figure 12:
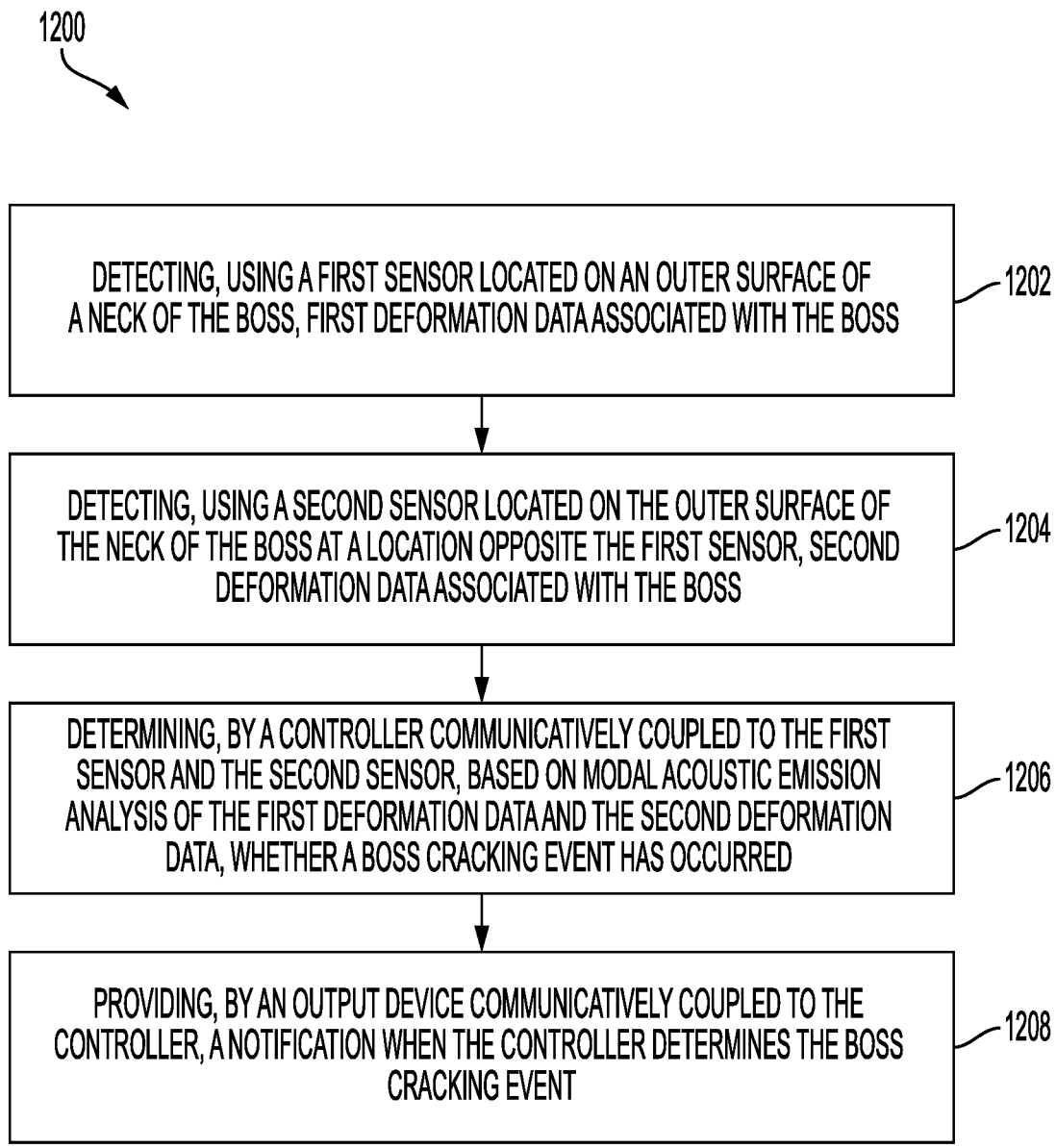
FIG. 12 is a flow diagram of a process performed by the system, according to various embodiments of the invention.

FIG. 12 illustrates a flowchart of a process 1200 performed by the systems described herein. A first sensor (e.g., sensor 202) located on an outer surface of a neck (e.g., neck 224) of the boss (e.g., boss 212/214) detects first deformation data associated with the boss (step 1202). A second sensor (e.g., sensor 202) located on the outer surface of the neck of the boss at a location opposite the first sensor (e.g., sensors 202A-1 and 202A-2) detects second deformation data associated with the boss. The first sensor and the second sensor may be broadband piezoelectric sensors and the deformation data may be represented by waves corresponding to voltage generated by the respective piezoelectric elements of the sensors over time.

A controller (e.g., controller 1102) communicatively coupled to the first sensor and the second sensor determines, based on modal acoustic emission analysis of the first deformation data and the second deformation data, whether a boss cracking event has occurred (step 1206). The boss cracking event may be a crack extension or a crack closure.

As described herein, the controller may determine that the boss cracking event has occurred by detecting a 180 degree phase shift between the first deformation data and the second deformation data, as illustrated in FIG. 4.

Also as described herein, the first deformation data includes a first arrival time of a first waveform (as detected by a first sensor) and the second deformation data includes a second arrival time of a second waveform (as detected by a second sensor). The second waveform is a first waveform detected by the second sensor and associated with the second deformation data, and the second arrival time is the arrival time associated with this detected waveform. The controller may determine that the boss cracking event has occurred by determining whether a difference between the first arrival time and the second arrival time is lower than a threshold time, as illustrated in FIGS. 5A-5D.

Also as described herein, the controller may determine that the boss cracking event has occurred by detecting high frequency content occurring at high $\Delta K$ levels or low frequency content occurring at low $\Delta K$ levels. When high frequency content is detected, the boss cracking event is a crack extension, and when low frequency content is detected, the boss cracking event is a crack closure.

An output device (e.g., output device 474) communicatively coupled to the controller provides a notification when the controller determines the boss cracking event (step 1208). For example, the output device may be a light in a passenger cabin or instrument panel of the vehicle that illuminates when the boss cracking event is detected. In another example, the output device may be a display screen that displays text and/or images warning of a boss cracking event being detected.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents. Each and every feature described herein, and each and every combination of two or more of such features, is included within the scope of the present invention provided that the features included in such a combination are not mutually inconsistent.

What is claimed is:

1. A system for detecting a crack in a boss of a cylinder, the system comprising:
   a first sensor located on an outer surface of a neck of the boss and configured to detect first deformation data associated with the boss;
   a second sensor located on the outer surface of the neck of the boss at a location diametrically opposing the first sensor and configured to detect second deformation data associated with the boss; and
   a controller communicatively coupled to the first sensor and the second sensor and configured to determine, based on the first deformation data and the second deformation data, whether a boss cracking event has occurred.

2. The system of claim 1, wherein the first sensor and the second sensor are broadband piezoelectric sensors.

3. The system of claim 1, wherein the controller determines whether the boss cracking event has occurred using modal acoustic emission (MAE) to analyze the first deformation data and the second deformation data.

4. The system of claim 3, wherein the controller is configured to determine whether the boss cracking event has occurred based on detecting a 180 degree phase shift between the first deformation data and the second deformation data.

5. The system of claim 4, wherein the first deformation data includes a first arrival time of a first waveform,
wherein the second deformation data includes a second arrival time of a second waveform, and
wherein the controller is further configured to determine whether the boss cracking event has occurred based on a difference between the first arrival time and the second arrival time being lower than a threshold time.

6. The system of claim 4, wherein the controller is further configured to determine whether the boss cracking event has occurred based on detection of low frequency content occurring at $\Delta K$ levels below a $\Delta K$ threshold, and
wherein the boss cracking event is a crack closure.

7. The system of claim 4, wherein the controller is further configured to determine whether the boss cracking event has occurred based on detection of high frequency content occurring at $\Delta K$ levels exceeding a $\Delta K$ threshold, and
wherein the boss cracking event is a crack extension.

8. The system of claim 1, wherein the first sensor and the second sensor are a first pair of sensors, and wherein the system further comprises a second pair of sensors located on the outer surface of the neck of the boss at opposite sides, and
wherein the controller is configured to determine whether the boss cracking event has occurred based on deformation data from the sensors of the first pair of sensors and the second pair of sensors.

9. The system of claim 1, further comprising an output device communicatively coupled to the controller and configured to provide a notification when the controller determines the boss cracking event.

10. A device for detecting a crack in a boss of a cylinder, the device comprising:
a first sensor located on an outer surface of a neck of the boss and configured to detect first deformation data associated with the boss;
a second sensor located on the outer surface of the neck of the boss at a location opposite the first sensor and configured to detect second deformation data associated with the boss; and
a controller communicatively coupled to the first sensor and the second sensor and configured to determine, based on the first deformation data and the second deformation data, whether a boss cracking event has occurred.

11. The device of claim 10, wherein the first sensor and the second sensor are broadband piezoelectric sensors.

12. The device of claim 10, wherein the controller determines whether the boss cracking event has occurred using modal acoustic emission (MAE) to analyze the first deformation data and the second deformation data.

13. The device of claim 12, wherein the controller is configured to determine whether the boss cracking event has occurred based on detecting a 180 degree phase shift between the first deformation data and the second deformation data.

14. The device of claim 13, wherein the first deformation data includes a first arrival time of a first waveform,
wherein the second deformation data includes a second arrival time of a second waveform, and
wherein the controller is further configured to determine whether the boss cracking event has occurred based on a difference between the first arrival time and the second arrival time being lower than a threshold time.

15. The device of claim 13, wherein the controller is further configured to determine whether the boss cracking event has occurred based on detection of high frequency content occurring at $\Delta K$ levels exceeding a $\Delta K$ threshold, and
wherein the boss cracking event is a crack extension.

16. The device of claim 13, wherein the controller is further configured to determine whether the boss cracking event has occurred based on detection of low frequency content occurring at $\Delta K$ levels below a $\Delta K$ threshold, and
wherein the boss cracking event is a crack closure.

17. The device of claim 10, wherein the first sensor and the second sensor are a first pair of sensors, and wherein the system further comprises a second pair of sensors located on the outer surface of the neck of the boss at opposite sides, and
wherein the controller is configured to determine whether the boss cracking event has occurred based on deformation data from the sensors of the first pair of sensors and the second pair of sensors.

18. A method for detecting a crack in a boss of a cylinder, the method comprising:
detecting, using a first sensor located on an outer surface of a neck of the boss, first deformation data associated with the boss;
detecting, using a second sensor located on the outer surface of the neck of the boss at a location opposite the first sensor, second deformation data associated with the boss;
determining, by a controller communicatively coupled to the first sensor and the second sensor, based on modal acoustic emission analysis of the first deformation data and the second deformation data, whether a boss cracking event has occurred; and
providing, by an output device communicatively coupled to the controller, a notification when the controller determines the boss cracking event.

19. The method of claim 18, wherein determining whether the boss cracking event has occurred comprises detecting a 180 degree phase shift between the first deformation data and the second deformation data.

20. The method of claim 19, wherein the first deformation data includes a first arrival time of a first waveform,
wherein the second deformation data includes a second arrival time of a second waveform, and
wherein determining whether the boss cracking event has occurred further comprises determining whether a difference between the first arrival time and the second arrival time is lower than a threshold time.

21. The method of claim 19, wherein determining whether the boss cracking event has occurred further comprises detecting high frequency content occurring at $\Delta K$ levels exceeding a $\Delta K$ threshold or low frequency content occurring at $\Delta K$ levels below the $\Delta K$ threshold, and
wherein the boss cracking event is a crack extension when high frequency content is detected and the boss cracking event is a crack closure when low frequency content is detected.

* * * * *